(12) United States Patent
Bravo

(10) Patent No.: US 8,641,265 B2
(45) Date of Patent: *Feb. 4, 2014

(54) PERFECTED CYLINDRICAL TANK FOR THE THERMAL TREATMENT OF A FOOD MIXTURE IN GENERAL AND MACHINE FOR THE PRODUCTION OF FOOD MIXTURES EQUIPPED WITH THIS CYLINDRICAL TANK

(75) Inventor: Genesio Bravo, Alte Ceccato—Vicenza (IT)

(73) Assignee: G.S.G. S.R.L., Vicenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/265,123

(22) PCT Filed: May 4, 2010

(86) PCT No.: PCT/EP2010/002831
§ 371 (c)(1),
(2), (4) Date: Oct. 18, 2011

(87) PCT Pub. No.: WO2010/130376
PCT Pub. Date: Nov. 18, 2010

(65) Prior Publication Data
US 2012/0044781 A1 Feb. 23, 2012

(30) Foreign Application Priority Data
May 14, 2009 (IT) .............................. MI2009A0838

(51) Int. Cl.
*B01F 7/04* (2006.01)
*B01F 15/06* (2006.01)

(52) U.S. Cl.
USPC ................................. 366/145; 366/147

(58) Field of Classification Search
USPC ................ 366/147, 145; 200/61.71–61.81
See application file for complete search history.

(56) References Cited

U.S. PATENT DOCUMENTS

| 1,477,279 | A | * | 12/1923 | Peck | 62/306 |
|---|---|---|---|---|---|
| 2,731,809 | A | * | 1/1956 | Hackney | 62/342 |
| 3,465,540 | A | * | 9/1969 | Carpigiani | 62/343 |
| 5,106,199 | A | * | 4/1992 | Eckel et al. | 366/147 |
| 6,474,862 | B2 | * | 11/2002 | Farrell | 366/147 |
| 6,637,214 | B1 | | 10/2003 | Leitzke | |
| 7,047,758 | B2 | | 5/2006 | Ross | |
| 2002/0131324 | A1 | * | 9/2002 | Farrell | 366/147 |
| 2009/0323462 | A1 | * | 12/2009 | Cocchi et al. | 366/147 |

FOREIGN PATENT DOCUMENTS

DE 19809801 9/1999

* cited by examiner

*Primary Examiner* — David Sorkin
*Assistant Examiner* — Abbas Rashid
(74) *Attorney, Agent, or Firm* — Themis Law

(57) ABSTRACT

The invention relates to a cylindrical tank for the thermal treatment of a food product, of the type including heating and/or cooling means of the food product, in addition to a mixer housed so as to be revolving in its interior. The tank has a cylindrical mantle, closed by a rear bottom and a front cover, there also being means (for feeding the product inside the tank. At least one temperature sensor of the food product is also situated in correspondence with this cover, with a sensitive part which, when the cover is closed, is in contact with the product contained in the tank.

9 Claims, 7 Drawing Sheets

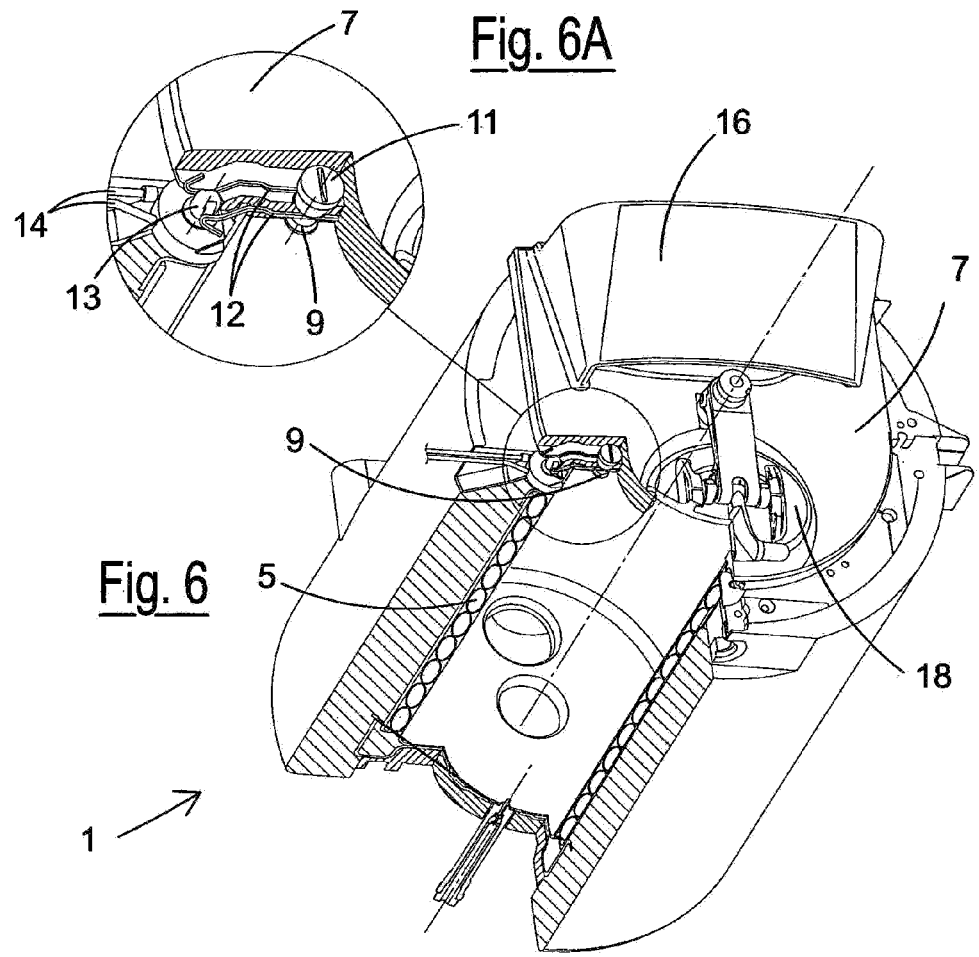
Fig. 6A
Fig. 6
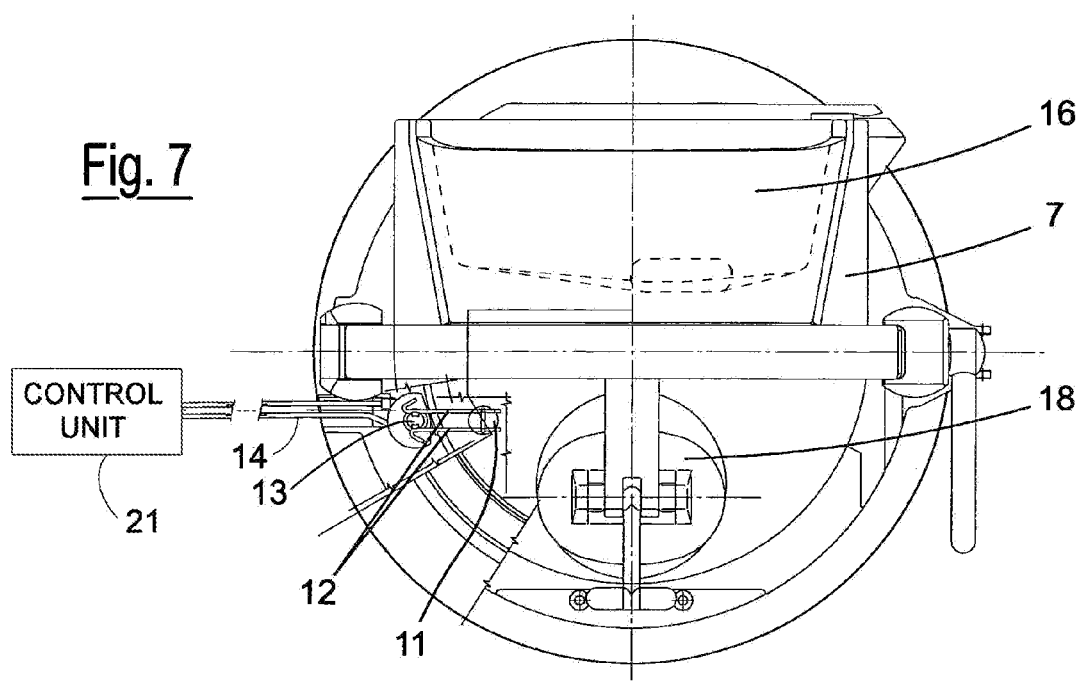
Fig. 7
CONTROL UNIT

PERFECTED CYLINDRICAL TANK FOR THE THERMAL TREATMENT OF A FOOD MIXTURE IN GENERAL AND MACHINE FOR THE PRODUCTION OF FOOD MIXTURES EQUIPPED WITH THIS CYLINDRICAL TANK

FIELD OF THE INVENTION

The present invention relates to a cylindrical tank suitable for the thermal treatment of food mixtures in general. The invention also relates to machines for the production of food mixtures equipped with said cylindrical tank.

The field of the invention is that relating to machines for processing food mixtures (such as ice cream, pastry creams, chocolate, delicatessen products and similar products) subjected to single or combined thermal treatment (for example cooling in the case of ice cream, heating and cooling in case of the pastry cream) inside a cylindrical tank (hereinafter called "cylinder") equipped with a suitable axially revolving mixer or stirrer. The temperature control of this mixture is effected by means of suitable cooling/heating systems, normally consisting of a coil situated on the outer surface of this cylinder.

BACKGROUND OF THE INVENTION

In order to determine the temperature value reached by a mixture of food inside the cylinder, the latter comprises a heat sensor, which, for construction reasons, is normally positioned in correspondence with the vertical rear wall forming the bottom of the cylinder, mostly arranged horizontally (with a horizontal axis).

The disadvantage of this known technique is mainly represented by the action of the mixer which, upon rotating, pushes the food mass towards the front area of the cylinder. In this case, and above all in the processing of small quantities of food, the sensor, situated on the outer wall of the cylinder, remains uncovered, i.e. it does not come into contact with the mixture, thus considerably misrepresenting the reading of the heat level reached by the latter.

Another solution is the one disclosed in U.S. Pat. No. 7,047,758 in which the temperature sensor is placed directly below the charging duct of the products; this solution has the drawback of altering the measurement of the temperature sensor, since the mass of the charged product comes into contact with the sensor when it has not yet been cooled by the cylinder.

SUMMARY OF THE INVENTION

The main objective of the present invention is to provide a new cylinder for the thermal treatment of a food mixture which, compared to traditional productions in the field, is equipped with means suitable for ensuring a reading of the actual heat level reached by the mixture.

A further objective of the invention is to provide a cylinder of the mentioned type, capable of detecting the temperature of the food mixture, regardless of its consistency (more or less fluid) and also of the quantity of mixture present inside the cylinder.

Another objective of the invention is to provide a cylinder of the mentioned type whose structure does not represent an obstacle for the normal heat treatment process of the mixture, and at the same time providing the instantaneous real temperature of the same inside the cylinder.

This and other objectives are achieved with the cylindrical tank and machine for the production of food mixtures according to claims 1 and 8, respectively. Preferred embodiments of the invention are indicated in the remaining claims.

Compared to traditional machines for the processing of food mixtures, that according to the invention offers the advantage that, thanks to the positioning of the sensor on the cover of the cylinder (i.e. the discharge section of the food mixture), the same machine guarantees constant contact between the sensor and the food mixture so as to allow the actual temperature value to be read, i.e. the temperature effectively reached by the foodstuff inside the cylinder. This result is also guaranteed in particular in the presence of reduced quantities of food mixture which, in the traditional machines of this type, inevitably leave the sensor positioned on the rear side of the cylinder, uncovered by the product.

Furthermore, the front positioning of the sensor on the cover which closes the cylinder body, as described above, offers the advantage of isolating this sensor with respect to the cooling/heating circuit, otherwise capable of altering its functionality. At the same time, the front positioning of the sensor, described above, does not jeopardize the efficiency of this circuit in the front area of the cylinder.

BRIEF DESCRIPTION OF THE DRAWINGS

These and other objectives, advantages and characteristics are evident from the following description of a preferred embodiment of the cylinder and machine of the invention, illustrated as a non-limiting example, in the figures of the enclosed drawings. In the same:

FIG. 6 illustrates a cross-section from below of the cylinder of FIG. 5;

FIG. 6A illustrates the detail A of FIG. 6;

FIG. 7 illustrates a front view of the cylinder of the invention with the cover in a closed position;

DETAILED DESCRIPTION OF EMBODIMENTS OF THE INVENTION

Figure 1:
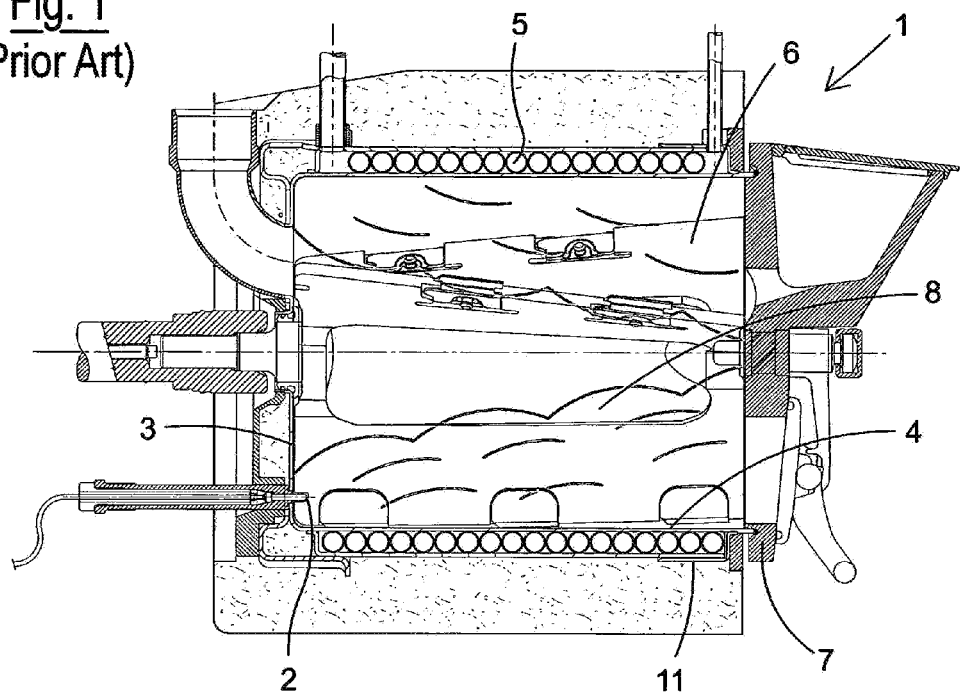
FIGS. 1 and 2 show in a longitudinal section, a cylinder of the known type for the heat treatment of a food mixture, under respectively full and partially empty conditions of the cylinder.

The cylinder of the invention, indicated as a whole with 1 in FIG. 1, is of the traditional type, in which a temperature sensor or probe 2 is situated on the rear wall or bottom 3 of the cylinder 1. The latter is also equipped, on its outer surface, with a coil 5 for the circulation of cooling or heating means. The same cylinder 1 is also completed by a front closing ring 11 on the above-mentioned coil 5, an axially revolving stirrer or internal mixer 6, in addition to a front cover or flange 7.

Figure 2:
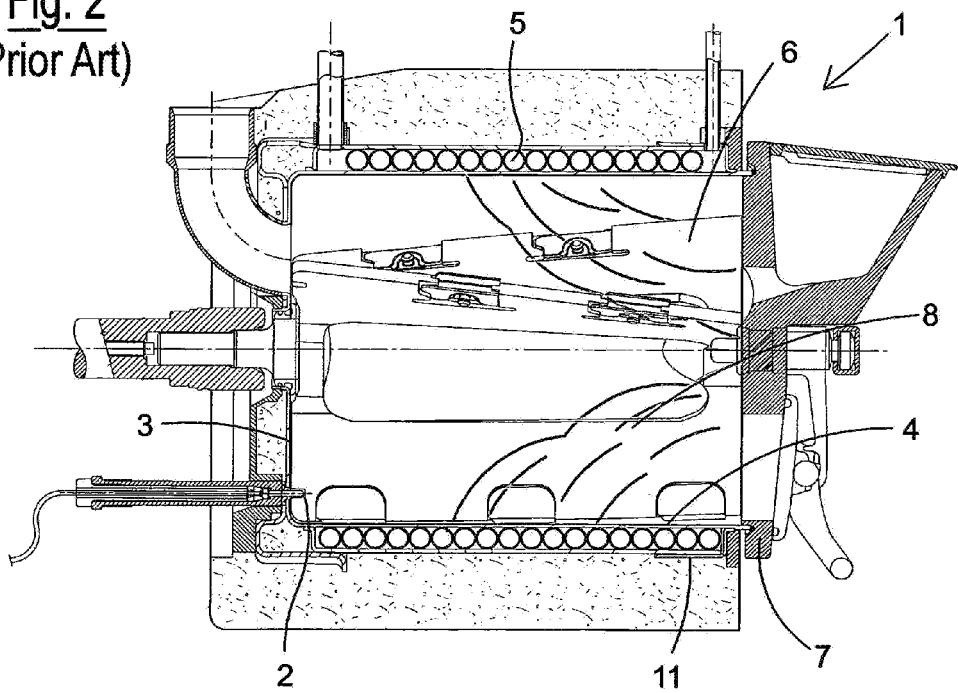

A maximum quantity (normally corresponding to half of the volume of the cylinder 1) of food product 8 is collected in the cylinder 1 of FIG. 1, whereas a small quantity is collected in the cylinder of FIG. 2. As can be observed, in the condition illustrated in FIG. 1, the temperature sensor 2 is immersed in the foodstuff 8, whereas in that illustrated in FIG. 2, the mentioned sensor is completely uncovered, consequently misrepresenting the temperature revealed by the same (as it is the temperature of the air and not the temperature of the food treated in the cylinder 1). Consequently, the above foodstuff at the outlet of the cylinder of FIG. 2 is not in the final processing conditions corresponding to those desired for its consumption (stability, creamy consistency, spreadability, etc.).

Figure 3:
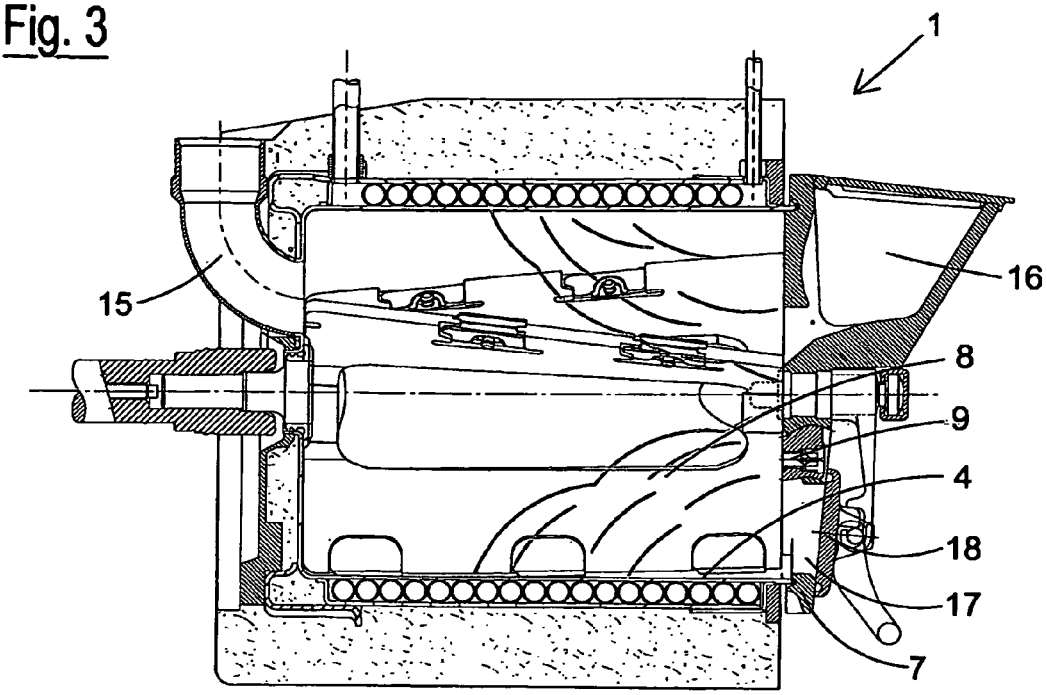
FIG. 3 illustrates, in a longitudinal section, a first embodiment of the cylinder according to the invention.
Figure 4:
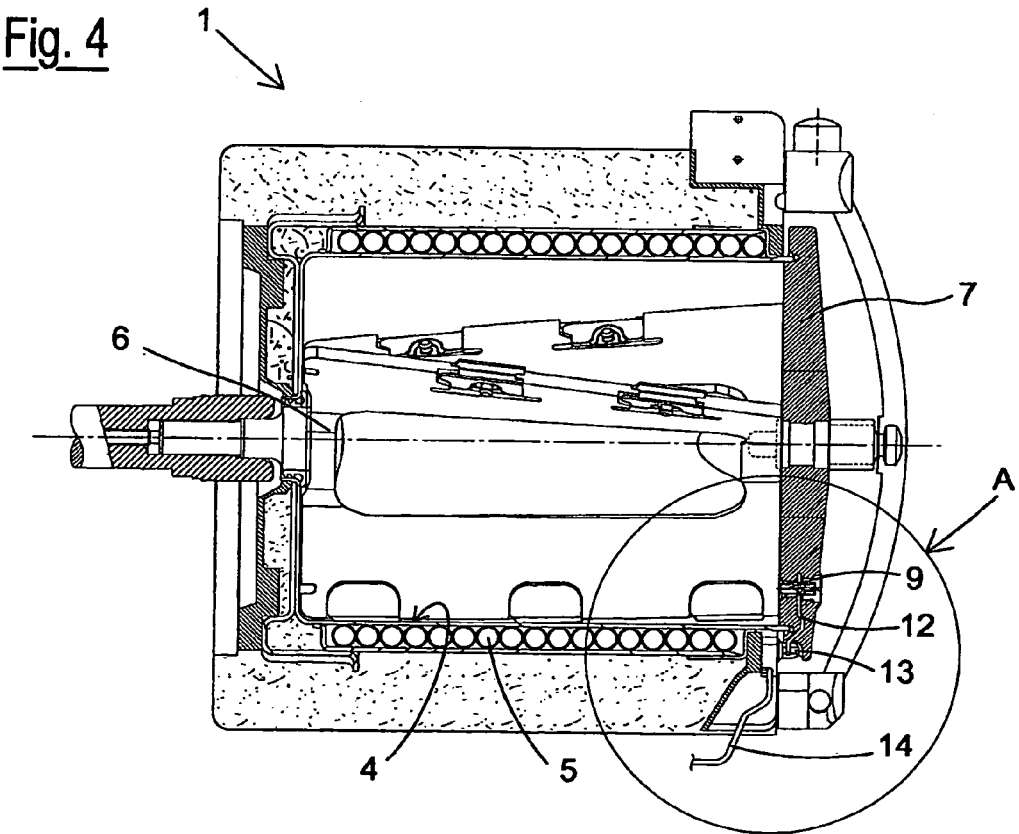
FIG. 4 illustrates the cylinder of FIG. 3 in a sectional plan view.
Figure 4A:
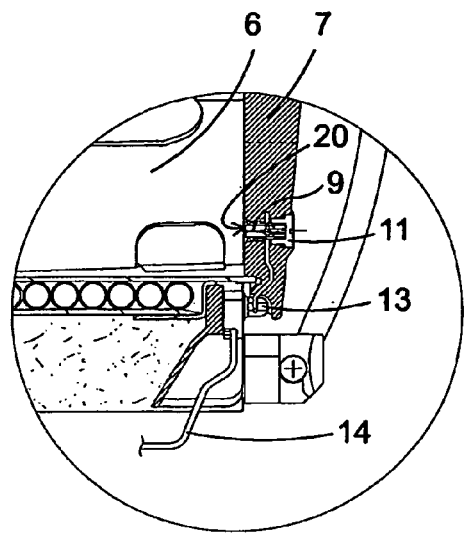
FIGS. 4A and 4B illustrate the detail A of FIG. 4, with the cover closed and with the cover open, respectively
Figure 4B:
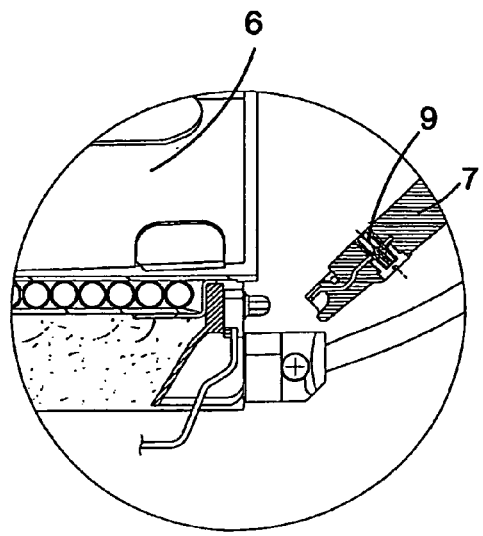

In order to overcome this drawback, the cylinder of the invention, as shown in FIG. 3, comprises the use of a temperature sensor 9 which is typically positioned in the front of the same cylinder 1. In particular, the above sensor 9 is situated in correspondence with the front cover 7 which closes this cylinder. The positioning of this sensor 9 directly on the cylinder 1, close to the area occupied by the spires of the coil 5, could jeopardize the delicate equilibrium of the heat treatment system of the mixture of foodstuff 8. If, in fact, this positioning were obtained by eliminating a certain number of these spires, the effect of this heat treatment would be considerably diminished, specifically in the most critical area of the cylinder, i.e. that corresponding to the discharge section of the product. On the other hand, the functionality of the sensor situated directly between the spires of the coil, would be inevitably jeopardized by the considerable heat gradient to which the same sensor would inevitably be subjected during the functioning of the machine.

This is the reason for the choice of the inventor, who placed the front sensor 9 not on the body of the cylinder 1, directly fixing it on the latter, but in correspondence with its front cover 7.

Figure 5:
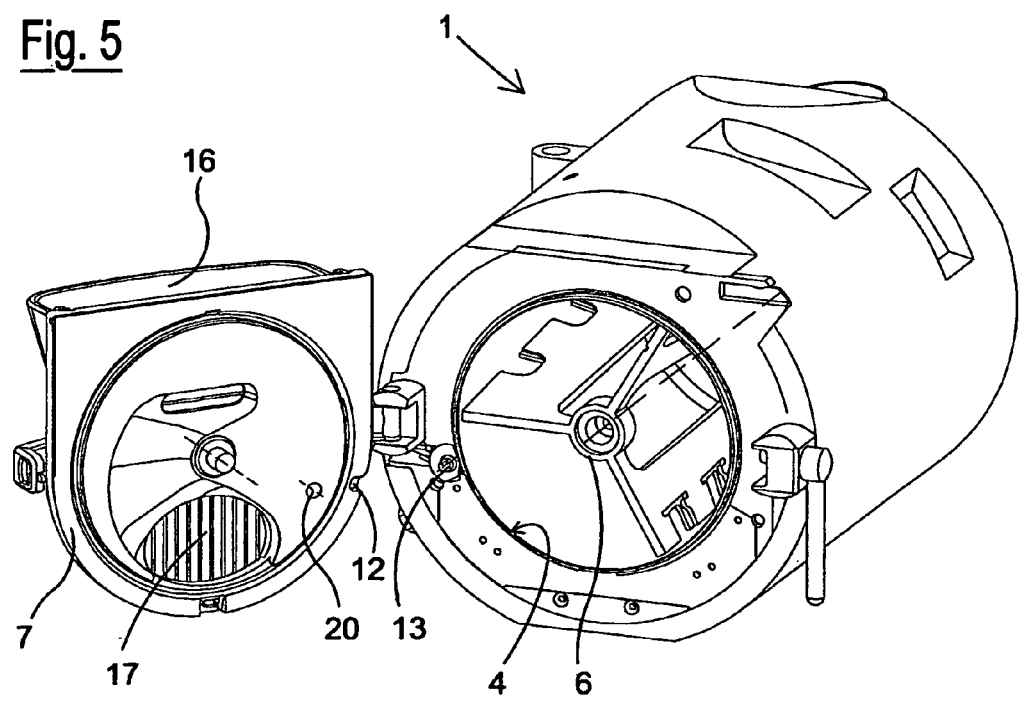
FIG. 5 illustrates a perspective view of the cylinder of the invention with the cover in an open position.
Figure 8:
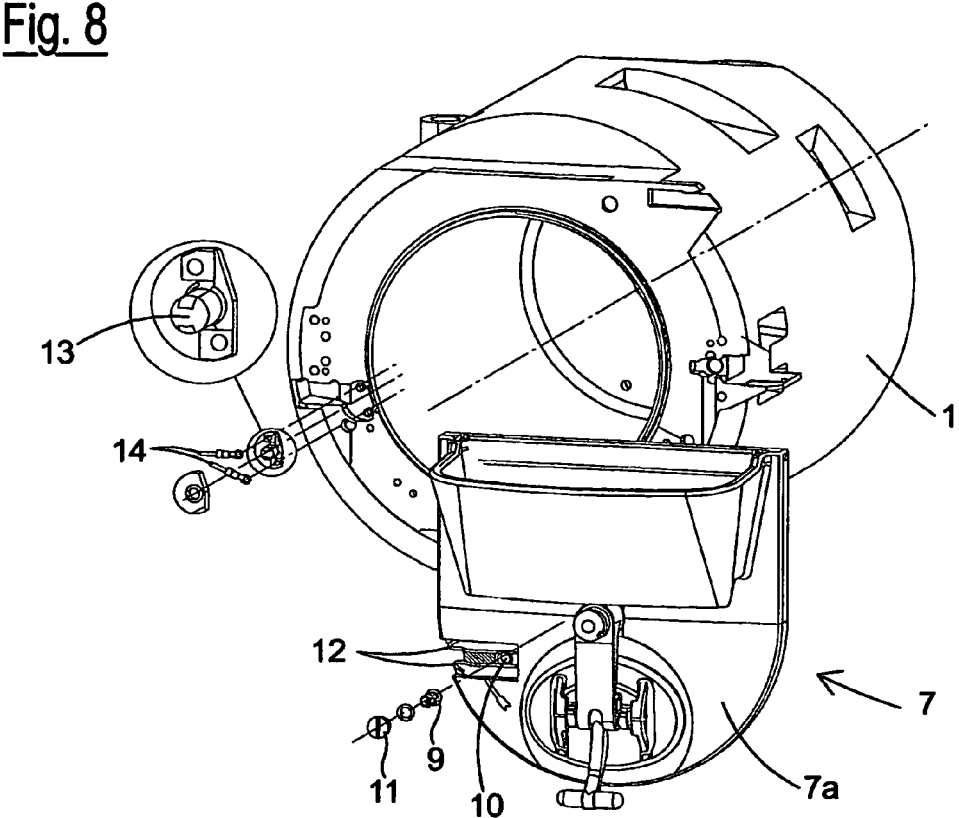
FIG. 8 illustrates the detail of the assembly of the sensor on the cylinder of the previous figures.

As better illustrated in FIG. 8, the sensor 9 is housed inside a seat 10 of the cover 7 of the cylinder 1, so that its sensitive part (20 FIG. 5) when the cover 7 is closed on the cylinder 1, is in contact with the food 8. The same sensor 9 is then blocked in this seat by means of a screw 11 which allows, when necessary, the easy substitution of the mentioned sensor, without creating any interference with other components.

Conductors 12, molded in the same plastic material as the flange 7 and connected to the sensor 9 in correspondence with respective hollow seats, situated on the metal hood of the latter, effect the electric connection, either click-wise or by sliding, between this sensor 9 and the respective fixed contact 13 assembled on the body of cylinder 1, in the corresponding closing position of the cover 7. Wires 14 are also included for the transmission of the temperature signal from the contact 13 to the control unit which controls the functions of the machine 21.

It has been advantageously discovered that, according to the invention, the sensor 9, when positioned in any point of the lower semi-portion 7a of the cover 7 (FIG. 8), provides the same precision level on the temperature detection of the food product 8 processed in the cylinder 1.

In the embodiment illustrated, the connection of the sensor 9 to the control unit of the machine is then restarted by closing the cover 7 on the cylinder 1, through the click-engagement of conductors 12 on the respective contact 13 assembled on this cylinder.

As shown in FIG. 3, the front flange 7 which closes the cylinder 1, comprises a hopper 16 for charging the ingredients, as an alternative or in addition to a rear duct 15 for feeding the product to be processed, and an opening 17 for the discharge of the final product, controlled by a small shutter 18 (see also FIGS. 6 to 8).

Figure 9:
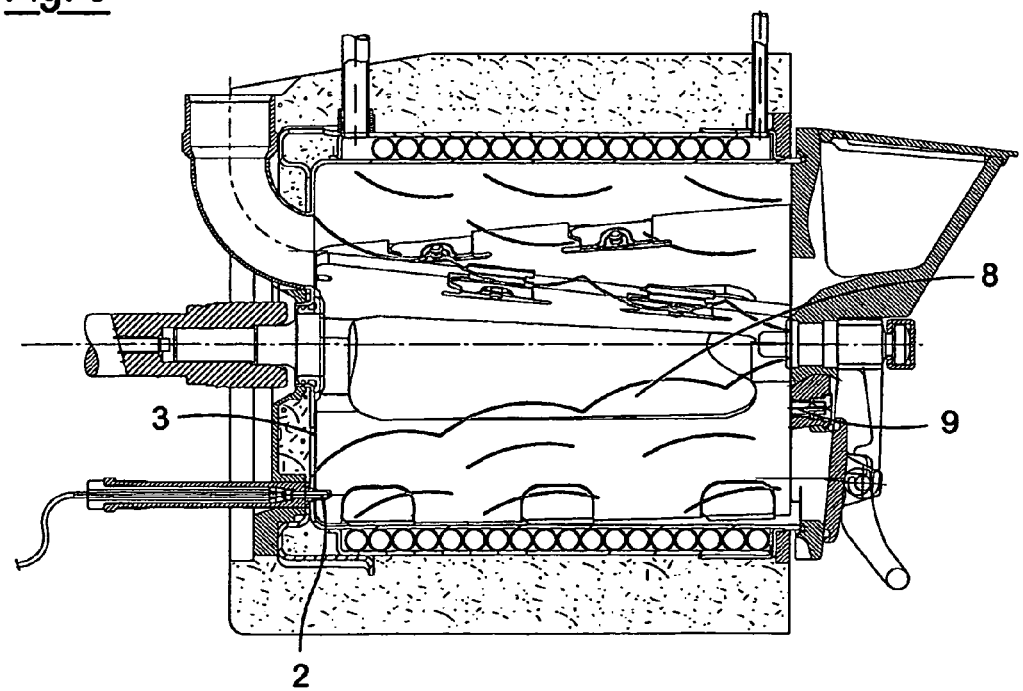
FIGS. 9 and 10 illustrate a variation of the cylinder of the invention, under full and partially empty conditions of the cylinder, respectively.
Figure 10:
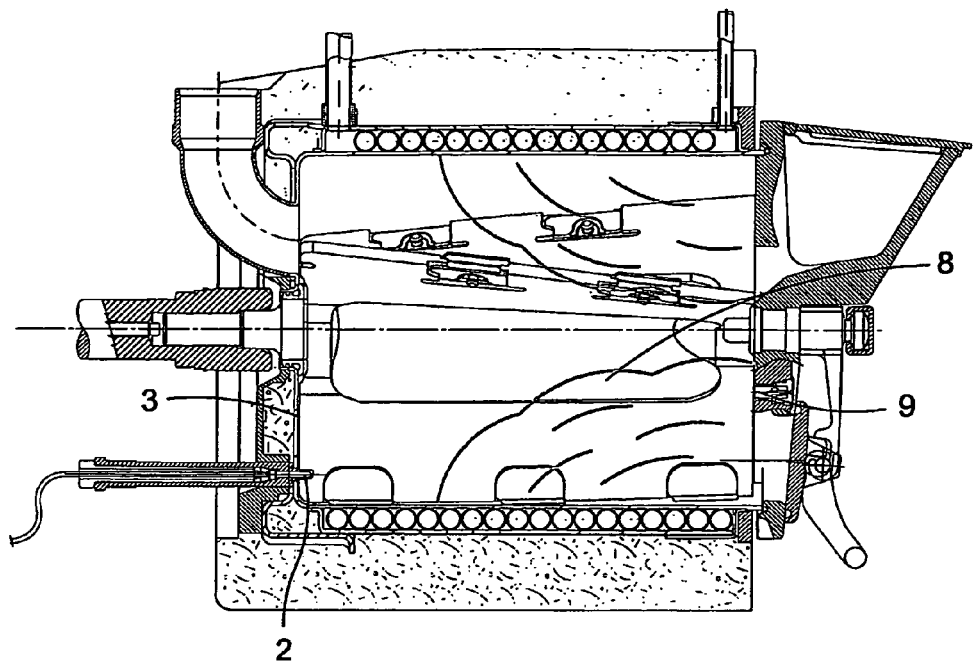

In the variations shown in FIGS. 9 and 10, the cylinder of the invention is equipped with both a rear temperature sensor 2 and also with a front temperature sensor 9.

When in use, the cylinder 1 can be fed with a quantity of food 8, for example through the mentioned duct 15, which terminates at the bottom of the same cylinder 1. This quantity can range between a full charge condition (corresponding to half of the theoretical capacity of said cylinder) and a partial charge condition (equivalent to less than a quarter of the theoretical capacity of the same cylinder D.

Figure 11:
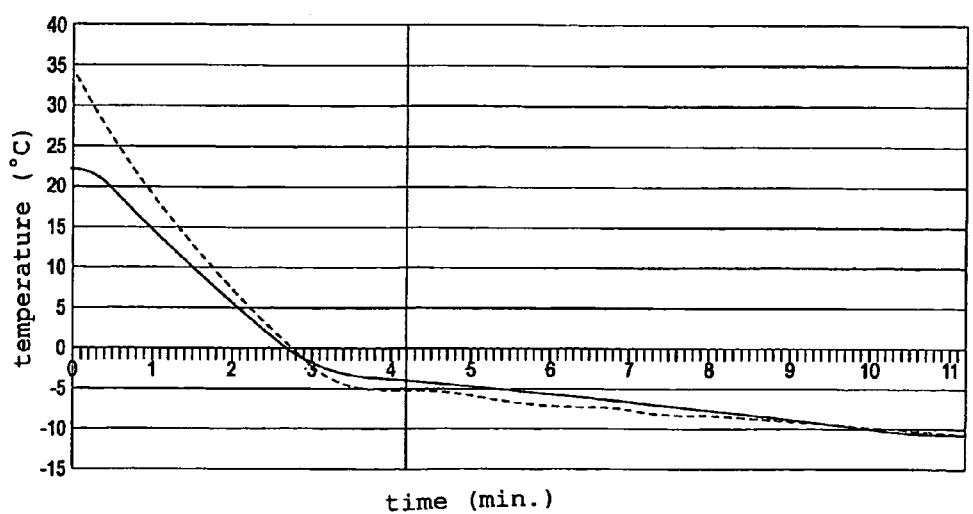
FIGS. 11 and 12 illustrate the temperature/time graphs of the foodstuff treated in the cylinders of FIGS. 9 (full cylinder) and 10 (cylinder partially empty), respectively.

Under the full charge condition of the cylinder 1 (FIG. 9), both of the sensors 2 and 9 are in direct contact with the food mixture, i.e. they are fully immersed in the mixture of food during the whole processing cycle. Under this condition, the temperature value revealed by the sensors 2 and 9, are substantially overlapping. In the example illustrated, which is a mixture of milk-cream ice-cream, the temperature difference revealed by the sensors is minimum for temperatures lower than zero (FIG. 11).

Figure 12:
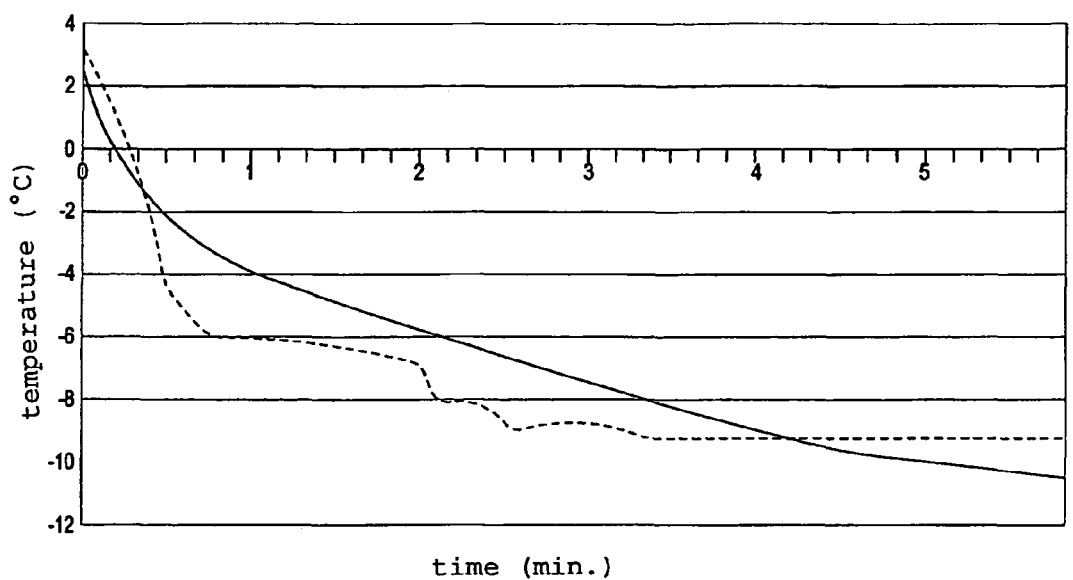

In the case, on the contrary, of the partial filling of the cylinder 1 (FIG. 10), the only sensor in contact with the food is the front sensor 9, as demonstrated by the temperature curves in FIG. 12. In particular, at temperatures lower than 0° C., the deviation between the temperature curves revealed by the sensors 2 and 9 is marked, whereas, under full cylinder conditions, this deviation is almost null.

Modifications can be applied to the invention as described above and illustrated in the enclosed sheet of drawings, for obtaining variations which in any case fall within the scope of the following claims. The number, type and positions of the mentioned sensors inside the cylinder 1, for example, can differ, the positioning of at least one of these on the front cover which closes this cylinder, however, remaining unchanged.

The cylinder of the invention can also be advantageously applied to horizontal creamers and also to combined machines for the pasteurization and whipping of food mixtures (for example machines known on the market under the trade-name "Trittico" of the company Bravo Spa).

The invention claimed is:

1. A cylindrical tank for thermal treatment of a food product comprising:
    a system for heating or cooling said food product;
    a mixer housed in the system for heating or cooling, so as to be axially revolving in an interior thereof;
    the tank comprising a cylindrical mantle closed by a rear bottom and a front cover, said front cover comprising a front opening for a discharge of a final product;
    a system for feeding the food product inside the tank; and
    at least one front sensor of a temperature of the food product contained inside the tank,
    wherein said system for feeding the food product inside said tank are provided at a bottom of said tank, and
    wherein said front sensor is housed inside a seat of the front cover of the tank and is electrically coupled to and decoupled from a fixed contact on the tank by having conductors extending from the front sensor engage and disengage the fixed contact on the tank,
    whereby closing the front cover causes an activation of the front sensor.

2. The tank according to claim 1, wherein said sensor is housed in the seat of said front cover with a sensitive part which, when the front cover is closed, is exposed to contact with the food product contained in the tank.

3. The tank according to claim 2, wherein said seat for the front sensor is provided in any point belonging to a lower half-portion of said front cover.

4. The tank according to claim 1, wherein said front cover is in plastic material, wherein said conductors are printed in the plastic material of the front cover and are suitable for providing an electric connection between the front sensor and the fixed contact, which is assembled in a fixed position on the tank in closed position.

5. The tank according to claim 4, wherein said conductors engage said fixed contact by having said conductors disposed in parallel positions and sliding against opposite sides of said fixed contact.

6. The tank according to claim 1, further comprising, in addition to the front sensor, a temperature sensor situated on a rear wall of the tank.

7. The tank according to claim 1, wherein the front cover comprises both a hopper for charging ingredients, as an alternative or in addition to a rear duct of the tank for feeding the food product to be processed, and a discharge opening of the final product controlled by a shutter.

8. A machine for production of food mixtures, comprising:
at least one tank according to claim 1.

9. The tank according to claim 1, further comprising wires providing an electrical connection between the fixed contact and a control unit, said control unit receiving a temperature signal from said front sensor.

* * * * *